United States Patent
Selfridge

(10) Patent No.: US 9,709,198 B1
(45) Date of Patent: Jul. 18, 2017

(54) CLAMPED CONNECTOR SYSTEMS FOR USE WITH PIPING ASSEMBLIES

(71) Applicant: General Electric Company, Schenectady, NY (US)

(72) Inventor: Kenneth Eugene Selfridge, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/363,355

(22) Filed: Nov. 29, 2016

(51) Int. Cl.
F16L 23/00 (2006.01)
F16L 23/08 (2006.01)
F16L 23/18 (2006.01)
F02C 7/22 (2006.01)

(52) U.S. Cl.
CPC .............. *F16L 23/08* (2013.01); *F02C 7/222* (2013.01); *F16L 23/18* (2013.01); *F05D 2220/32* (2013.01); *F05D 2240/35* (2013.01)

(58) Field of Classification Search
USPC ....... 285/364, 114, 117, 337, 367, 410, 407, 285/409, 914
See application file for complete search history.

(56) References Cited

U.S. PATENT DOCUMENTS

| | | | | |
|---|---|---|---|---|
| 1,076,515 | A | * | 10/1913 | Owens ...................... F16L 3/00 285/117 |
| 2,788,993 | A | * | 4/1957 | Oldham ................. F16L 23/10 285/148.13 |
| 3,206,230 | A | * | 9/1965 | Weinhold ................ F16L 33/12 285/114 |
| 3,272,536 | A | * | 9/1966 | Weinhold ................ F16L 33/12 285/114 |
| 3,889,984 | A | | 6/1975 | Lambiris |
| 4,079,970 | A | * | 3/1978 | Brett ....................... F16L 39/04 285/124.3 |
| 4,191,410 | A | * | 3/1980 | Voituriez ................ F16L 23/10 285/367 |
| 4,549,332 | A | * | 10/1985 | Pouliot ................. F16L 55/005 24/115 H |
| 4,552,390 | A | | 11/1985 | Calmettes |
| 4,556,241 | A | * | 12/1985 | Weinhold ................ F16L 33/12 285/244 |
| 5,387,017 | A | | 2/1995 | Gill |
| 5,782,499 | A | | 7/1998 | Gfrerer et al. |
| 5,868,441 | A | | 2/1999 | Gill |
| 6,234,541 | B1 | | 5/2001 | Wagner et al. |

(Continued)

*Primary Examiner* — Aaron Dunwoody
(74) *Attorney, Agent, or Firm* — Armstrong Teasdale LLP

(57) ABSTRACT

A clamp connector system for use with a plurality of flanged connections is provided. Each of the flanged connections includes a first hub, a first flange, a second hub, and a second flange. The system includes a first clamp connector sized to circumferentially couple about the first and second flanges of a first of the flanged connections, and a second clamp connector sized to circumferentially couple about the first and second flanges of a second of the flanged connections. The system further includes an interference feature defined on at least one of the first flanged connection and the second clamp connector. The interference feature is oriented to prevent the first flange of the first flanged connection from coupling to the second flange of the second flanged connection.

20 Claims, 4 Drawing Sheets

(56) References Cited

U.S. PATENT DOCUMENTS

| | | | |
|---|---|---|---|
| 6,481,457 B2 * | 11/2002 | Hayes | F16L 55/005 |
| | | | 137/377 |
| 7,458,619 B2 | 12/2008 | Cassel et al. | |
| 7,490,871 B2 | 2/2009 | Avram et al. | |
| 7,789,434 B2 | 9/2010 | Nagle et al. | |
| 7,832,776 B2 | 11/2010 | Cassel et al. | |
| 7,850,213 B2 | 12/2010 | Gill | |
| 8,657,255 B2 * | 2/2014 | Goodman | B64D 13/02 |
| | | | 251/146 |
| 8,740,260 B1 * | 6/2014 | Liew | E21B 33/03 |
| | | | 285/364 |
| 2003/0116967 A1 * | 6/2003 | Kornau | F16L 23/08 |
| | | | 285/364 |
| 2006/0273589 A1 * | 12/2006 | Weinhold | F16L 3/1222 |
| | | | 285/409 |
| 2012/0256418 A1 | 10/2012 | Horgan | |
| 2014/0217728 A1 * | 8/2014 | Ghirardi | F16L 23/08 |
| | | | 285/410 |

* cited by examiner

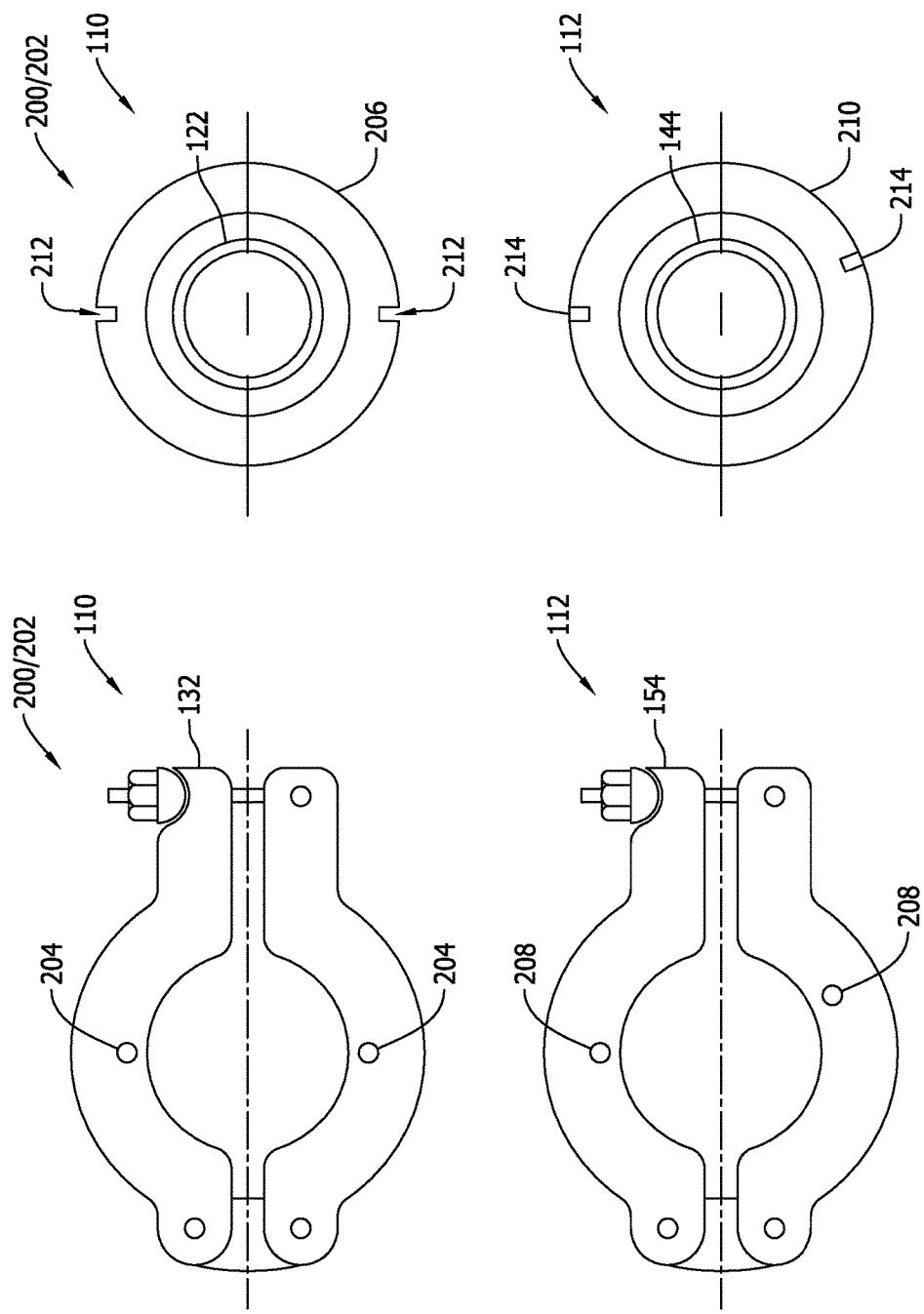

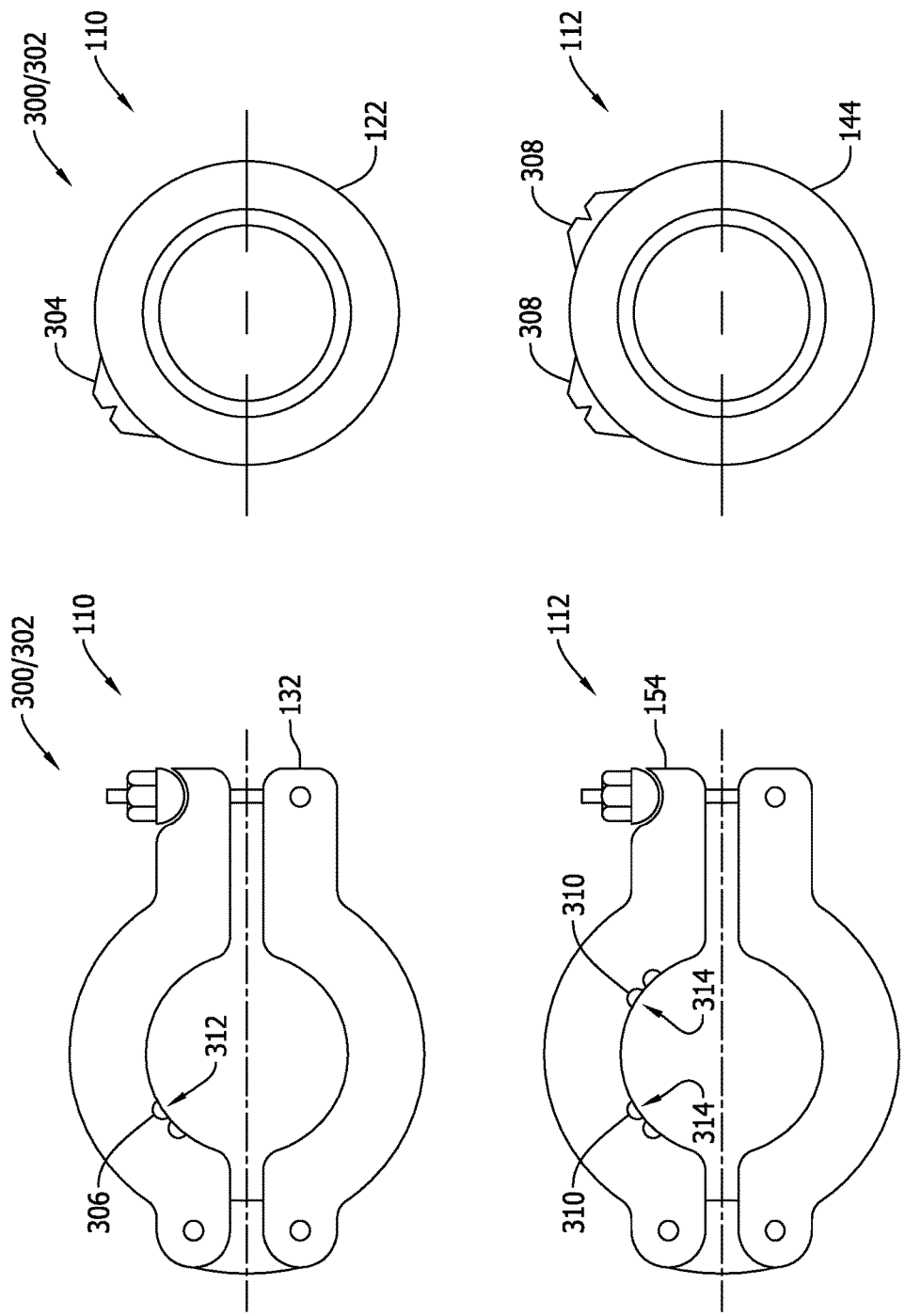

CLAMPED CONNECTOR SYSTEMS FOR USE WITH PIPING ASSEMBLIES

BACKGROUND

The present disclosure relates generally to piping assemblies and, more specifically, to clamped flange connector systems used with piping assemblies.

At least some known pipelines that channel fluid therethrough have sections that are coupled together via mechanical connectors, such as a clamped flange connector. Known clamped flange connectors typically include two hubs that are similarly sized. Each hub is coupled to an end of each interfacing pipeline section, such that each hub has a flange member extending therefrom. The two hubs are coupled together via a clamp that extends circumferentially about the flange members. The clamp carries axial and bending loads induced from the pipeline and also carries internal pressure loads induced from the pipeline. Clamped flange connectors may be used for a variety of applications, such as, but not limited to, power generation systems (e.g., gas turbine engine fuel supply systems), oil & gas production systems, chemical processing systems, food processing systems, and aerospace manufacturing systems.

Some known clamped flange connectors are removable such that two pipeline sections may be disconnected and then reconnected again. However, some known applications include multiple pipelines, all with similar sizes, in which the connections are all made at a similar location. As such, a likelihood of cross-coupling or cross-connecting two different pipeline sections is increased. For example, at least some known fuel supply systems of gas turbine engines include multiple flexible fuel pipelines that channel fuel flow from a fuel source to a combustion assembly. Each fuel pipeline may include multiple sections that are coupled together via the clamped flange connectors. In some fuel supply systems, each fuel pipeline carries a similar fuel, but each of the multiple fuel lines is coupled to a specific circuit of the combustion assembly, and different circuits are supplied with fuel at different times during operation. During maintenance of the gas turbine engine these fuel pipeline sections may be disconnected, and after maintenance, the fuel pipeline sections may be reconnected via the clamped flange connector. However, if the fuel pipelines are cross-coupled during the reconnection, combustion problems may occur in the gas turbine engine during operation, creating excess wear. Some known clamped flange connectors may be labeled to reduce cross-coupling, however, the labels may become unreadable over time.

BRIEF DESCRIPTION

In one aspect, a clamp connector system for use with a plurality of flanged connections is provided. Each of the flanged connections includes a first hub, a first flange extending from the first hub, a second hub, and a second flange extending from the second hub. The system includes a first clamp connector sized to circumferentially couple about the first and second flanges of a first of the plurality of flanged connections, such that the first and second flanges of the first flanged connections are secured together. The system also includes a second clamp connector sized to circumferentially couple about the first and second flanges of a second flanged connection of the plurality of flanged connections, such that the first and second flanges of the second flanged connection are secured together. The system further includes an interference feature defined on at least one of the first flanged connection and the second clamp connector. The interference feature is oriented to prevent the first flange of the first flanged connection from coupling to the second flange of the second flanged connection.

In another aspect, a clamp connector system for use with a gas turbine assembly is provided. The system includes a plurality of flanged connections. Each of the flanged connections includes a first hub, a first flange extending from the first hub, a second hub, and a second flange extending from the second hub. The system also includes a first clamp connector sized to circumferentially couple about the first and second flanges of a first of the plurality of flanged connections, such that the first and second flanges of the first flanged connections are secured together. Additionally, the system includes a second clamp connector sized to circumferentially couple about the first and second flanges of a second flanged connection of the plurality of flanged connections, such that the first and second flanges of the second flanged connection are secured together. The system further includes an interference feature defined on at least one of the first flanged connection and the second clamp connector. The interference feature is oriented to prevent the first flange of the first flanged connection from coupling to the second flange of the second flanged connection.

In a further aspect, a gas turbine assembly is provided. The gas turbine assembly includes a fuel supply system coupled to a gas turbine via a plurality of flanged connections. Each of the flanged connections includes a first hub, a first flange extending from the first hub, a second hub, and a second flange extending from the second hub. The system also includes a clamp connector system including a first clamp connector sized to circumferentially couple about the first and second flanges of a first of the plurality of flanged connections, such that the first and second flanges of the first flanged connections are secured together. The clamp connector system also includes a second clamp connector sized to circumferentially couple about the first and second flanges of a second flanged connection of the plurality of flanged connections, such that the first and second flanges of the second flanged connection are secured together. The system further includes an interference feature defined on at least one of the first flanged connection and the second clamp connector. The interference feature is oriented to prevent the first flange of the first flanged connection from coupling to the second flange of the second flanged connection.

BRIEF DESCRIPTION OF THE DRAWINGS

FIG. 3 is a schematic view of an exemplary clamp connector portion of another exemplary embodiment of a clamp connector system, for use with the exemplary pair of connection joints shown in FIG. 1;

FIG. 4 is a cross-sectional view of an exemplary hub portion of the exemplary clamp connector system shown in FIG. 3;

FIG. 5 is a schematic view of an exemplary clamp connector portion of another exemplary embodiment of a clamp connector system, for use with the exemplary pair of connection joints shown in FIG. 1; and FIG. 6 is a cross-sectional view of an exemplary hub portion of the exemplary clamp connector system shown in FIG. 5; and

DETAILED DESCRIPTION OF THE INVENTION

Figure 1:
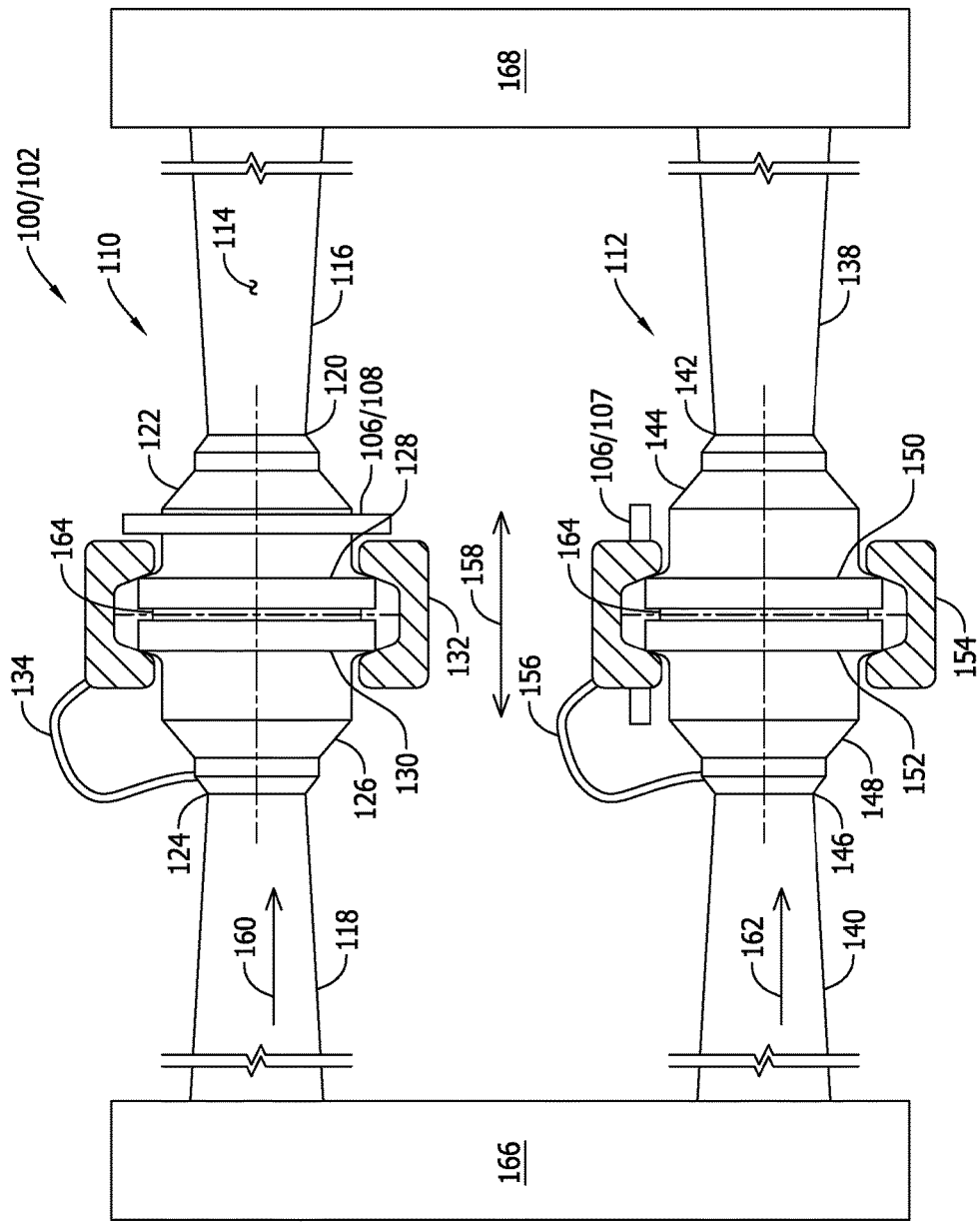
FIG. 1 is a schematic view of an exemplary pair of connection joints including an exemplary embodiment of a clamp connector system in an exemplary non-interference position.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Embodiments of the present disclosure relate to clamped flange connector systems and methods of assembly thereof. In the exemplary embodiment, a first pipeline includes a first clamp flange assembly that enables two sections of pipeline to be coupled together. The first clamp flange assembly includes an interference feature, such as a first member, that is coupled to the clamp connector and that is attached to a hub of one of the pipeline sections. A second similar sized pipeline also includes a second clamp flange assembly that facilitates coupling two sections together. The second clamp flange assembly includes an interference feature, such as a second member, that is coupled to a hub of one of the pipeline sections. To ensure that only the first pipeline sections are coupled together, and that only the second pipeline sections are coupled together, e.g., the sections are not cross-coupled, the interference feature is oriented to prevent sections of the first pipeline section from coupling to sections of the second pipeline.

In some embodiments, the first member includes a male member and the second member includes a corresponding female member sized to receive the male member to enable the first pipeline sections to connect together and the second pipeline sections to connect together respectively. In some embodiments, the male and female members include two or more corresponding positions such that the interference assembly may be used with two or more pipelines. By attaching the interference features to the clamped flange connector system, undesirable and improper pipeline connections are substantially prevented.

Figure 2:
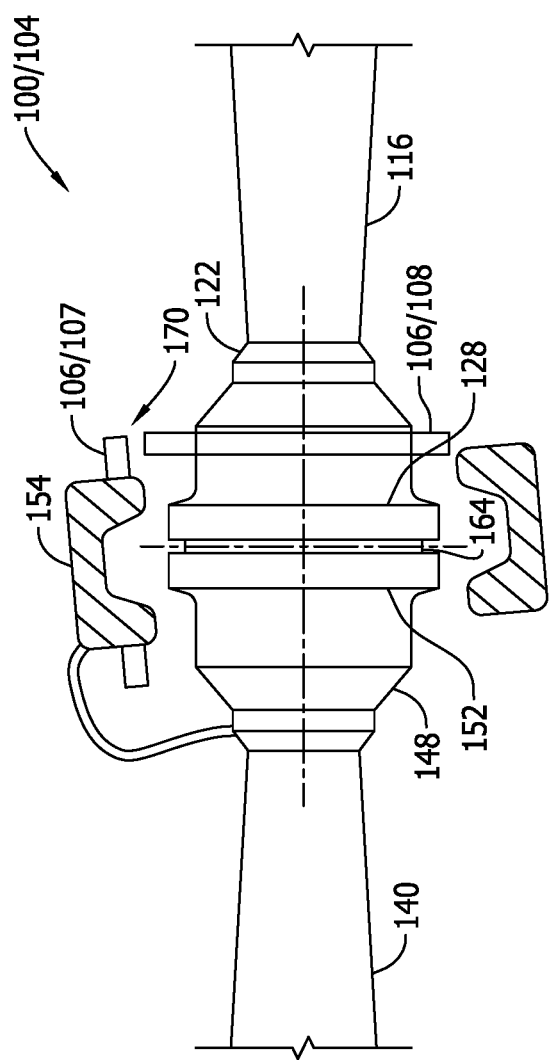
FIG. 2 is a schematic view of the exemplary pair of connection joints shown in FIG. 1, including the exemplary clamp connector system shown in FIG. 1 in an exemplary interference position.

FIG. 1 is a schematic view of an exemplary pair of connection joints 110 and 112, including an exemplary embodiment of a clamp connector system 100 in an exemplary non-interference position 102. FIG. 2 is a schematic view of connection joints 110 and 112 including clamp connector system 100 in an exemplary interference position 104. In the exemplary embodiment, clamp connector system 100 includes an interference feature 106, such as, for example a first member 107 and a second member 108. When in non-interference position 102, first connection joint 110 and second connection joint 112 are illustrated in a desired coupled connection. First connection joint 110 includes a first pipeline 114 that includes at least a first section 116 and a second section 118. A first hub 122 is coupled to an end 120 of first section 116 and a second hub 126 is coupled to an end 124 of second section 118. Each hub 122 and 126 includes a first flange 128 and a second flange 130 that each extend outward therefrom. In the exemplary embodiment, second member 108 is a ring that fits about, and is coupled to, first hub 122 such that second member 108 is offset from first flange 128. In alternative embodiments, second member 108 may have any other shape that enables interference feature 106 to function as described herein. First connection joint 110 also includes a first clamp connector 132. First clamp connector 132 is coupled to second hub 126 via a first cable 134. It should be understood that the term "cable" as used herein includes any suitable retaining member, such as but not limited to a chain or plastic line, that enables coupling of a clamp connector to a hub for movement relative to the hub, as described herein.

Second connection joint 112 includes a second pipeline 136 that includes a first section 138 and a second section 140. A third hub 144 is coupled to an end 142 of first section 138, and a fourth hub 148 is coupled to an end 146 of second section 140. Each hub 144 and 148 includes a third flange 150 and a fourth flange 152, respectively that extend outward therefrom. Second connection joint 112 also includes a second clamp connector 154. Second clamp connector 154 is coupled to fourth hub 148 via a second cable 156. In the exemplary embodiment, first member 107 is a pin that is coupled to second clamp connection 154 such that first member 107 extends in an axial direction 158 and is substantially orthogonal to second member 108. In alternative embodiments, first member 107 may have any other shape that enables interference feature 106 to function as described herein.

In operation, first pipeline 114 channels a flow 160 of a first fluid therethrough, and second pipeline 136 channels a flow 162 of a second fluid therethrough. For example, in the exemplary embodiment, first and second pipelines 114 and 136 are flexible fuel hose lines that channel fluid between a fuel supply system 166 to a gas turbine combustion assembly 168, and first pipeline 114 is coupled to a first circuit of combustion assembly 168 and second pipeline 136 is coupled to a second circuit of combustion assembly 168. Each clamp connecter 132 and 154 facilitates forming connection joints 110 and 112 between first pipeline section 116 and 138, and second pipeline section 118 and 140, respectively. Clamp connecters 132 and 154 maintain connection joints 110 and 112 as fluid 160 and 162 flows therethrough inducing loads to connection joints 110 and 112.

Connection joints 110 and/or 112 may be disconnected during maintenance operations of gas turbine combustion assembly 168. To disconnect or decouple connection joint 110, initially clamp connector 132 is removed from first and second flanges 128 and 130 by loosening bolts (not shown) that facilitate a tight fitting connection to each hub 122 and 126. Each hub 122 and 126 is then moved axially 158 away from each other. Similarly, to disconnect or decouple connection joint 112, clamp connector 154 is removed from third and fourth flanges 150 and 152 by loosening bolts (not shown) thereon that facilitate a tight fitting connection to each hub 144 and 148. Each hub 144 and 148 is then moved axially 158 away from each other.

When reconnecting or coupling connection joint 110, first hub 122 is positioned adjacent to second hub 126 such that first flange 128 is adjacent to second flange 130. In some embodiments, a seal ring 164 is positioned between first flange 128 and second flange 130 to facilitate a more seal-tight connection. Clamp connector 132 is then positioned around first and second hubs 122 and 126 such that clamp connector 132 receives both first and second flanges 128 and 130. The bolts on clamp connector 132 are tightened to form a secure connection joint 110 for fluid 160 to be channeled therethrough. Similarly, when the user is coupling or reconnecting connection joint 112, third hub 144 is positioned adjacent to fourth hub 148 such that third flange 150 is adjacent to fourth flange 152. In some embodiments, a seal ring 164 is positioned between third flange 150 and fourth flange 152 to facilitate a more seal-tight connection. Clamp connector 154 is then positioned around third and fourth hubs 144 and 148 such that clamp connector 154 receives both third and fourth flanges 150 and 152. The bolts on clamp connector 154 are tightened to form a secure connection joint 112 for fluid 162 to be channeled therethrough.

In the exemplary embodiment, when in non-interference position 102 first and second sections 116 and 118 of first pipeline 114 are coupled together such that first fluid flow 160 may be channeled to the desired circuit of the combustor assembly. Similarly, first and second sections 138 and 140 of second pipeline 136 are coupled together to enable second fluid flow 162 to be channeled to the desired circuit of the combustion assembly. In the exemplary embodiment, all four hubs 122, 126, 144, and 148 are substantially identically sized and have a similar geometry. For example, in the exemplary embodiment, all four flanges 128, 130, 150, and 152 have a substantially equal diameter such that clamp connectors 132 and 154 are similarly sized. As such, the likelihood of cross-coupling the pipeline sections together is increased. More specifically, without the inclusion of interference feature 106 hub 122 may be inadvertently coupled to hub 148 and/or hub 126 may be inadvertently coupled to hub 144.

Referring to FIG. 2, clamp connector system 100 and interference feature 106 facilitates reducing the likelihood of pipeline sections being cross-coupled together, such as coupling sections 116 and 140 together, or coupling sections 118 and 138 together. For example, when first and second members 107 and 108 are in interference position 104, first section 116 of first pipeline 114 is prevented from being positioned adjacent second section 140 of second pipeline 136 and coupled together. As such, first section 116 is not inadvertently coupled to second section 140, and second fluid flow 162 is not channeled to the wrong circuit of combustor assembly 168 (shown in FIG. 1) generating possible combustion problems and possible increased maintenance costs. To facilitate preventing such inadvertent coupling, interference feature first member 107 is coupled to second clamp connector 154, and second clamp connector 154 is coupled to fourth hub 148 via cable 156. As such, to couple to fourth hub 148, second clamp connector 154 must be used. In addition, interference feature second member 108 is coupled to first hub 122. Thus, if an attempt is made to couple section 116 to section 140, second member 108 prevents first member 107 at an interference area 170 such that second clamp connector 154 cannot be positioned around flanges 128 and 152, and such that hubs 122 and 148 cannot be coupled together. In such an event, pipeline sections 116, 118, 138, and 140 need to be repositioned to ensure the correct hubs are aligned relative to each other to enable a proper coupling and to ensure that fluid flows 160 and 162 may be channeled to the proper circuit of the combustor assembly. By physically preventing assembly of pipelines 114 and 136, interference feature 106 provides a visual notification to a user of the coupling/alignment issue with pipelines 114 and 136, before operation of gas turbine combustion assembly 168 may occur.

In the exemplary embodiment, interference feature 106 may be coupled to an existing clamp flange assembly. For example, first member 107 may be welded to clamp connector 154 and second member 108 may be welded to hub 122. Furthermore, in the exemplary embodiment, cables 134 and 156 are welded to the respective hubs 126 and 148, as well as, the respective clamp connectors 132 and 154. In alternative embodiments, interference feature 106 may be formed unitarily with the clamp flange assembly, such that first member 107 and clamp connector 154 are a one piece assembly, and second member 108 and hub 122 are a separate one piece assembly.

In certain embodiments, clamp connector system 100 includes only one of first cable 134 and second cable 156. More specifically, first cable 134 affixing first clamp connector 132 to second hub 126, or alternatively second cable 156 affixing second clamp connector 154 is to fourth hub 148, is sufficient by itself to indicate to a user that second clamp connector 154 including interference feature 106 is intended for use with second connection joint 112, rather than with first connection joint 110.

FIG. 3 is a schematic view of an exemplary clamp connector portion of another exemplary embodiment of a clamp connector system, designated clamp connector system 200, for use with connection joints 110 and 112 shown in FIG. 1. FIG. 4 is a cross-sectional view of an exemplary hub portion of clamp connector system 200. Clamp connector system 200 includes elements substantially similar to clamp connector system 100, including but not limited to first clamp connector 132, second clamp connector 154, first hub 122, and third hub 144. However, in the exemplary embodiment, clamp connector system 200 also includes an interference feature 202. Interference feature 202 includes at least one first or male member 204 and a second or female member 206 at first connection joint 110, and at least a first or male member 208 and a second or female member 210 at second connection joint 112. For example, in the exemplary embodiment, male member 204 includes two pins that extend outward from clamp connector 132 and female member 206 includes a ring coupled about first hub 122 of first connection joint 110 that includes complementary notches 212 defined therein. Male member 208 also includes two pins that extend outward from clamp connector 154 and female member 210 also includes a ring coupled around third hub 144 of second connection joint 112 that includes complementary notches 214 defined therein. In alternative embodiments, male members 204 and 208 and female members 206 and 210 are shaped and/or positioned in any other configuration that enables clamp connector system 200 to function as described herein.

To couple first pipeline 114 together, first hub 122 is positioned adjacent to second hub 126 (shown in FIG. 1) with first clamp connector 132 connected thereto such that clamp connector 132 receives at least a portion of hub flanges 128 and 130 (both shown in FIG. 1). Male members 204 are received within corresponding notches 212 of female member 206 such that clamp connector 132 is positionable around the hubs as described above. Similarly, to couple second pipeline 136 together, third hub 144 is positioned adjacent to fourth hub 148 (shown in FIG. 1) with second clamp connector 154 coupled thereto such that clamp connector 154 receives at least a portion of hub flanges 150 and 152 (both shown in FIG. 1). Male members 208 are received within corresponding notches 214 of female member 210 such that clamp connector 154 is positionable around the hubs as described above.

As such, if an attempt to couple two pipeline sections together is made, such as sections 116, 118, 138, and 140 (all shown in FIG. 1), only the sections that have corresponding male and female members can be physically coupled together. If two mismatched pipeline sections are attempted to be coupled together, e.g., two sections that do not have corresponding male and female members, clamp connector system 200 and interference feature 202 prevents first clamp connector 132 from coupling to third hub 144 and second clamp connector 154 from coupling to first hub 122.

In alternative embodiments, clamp connector system 200 and/or interference feature 202 may be modified to include any other number of additional pipelines to facilitate reducing the likelihood of improper pipeline sections being inadvertently coupled together. For example, on a third pipeline, interference feature 202 may include one or more male members and complementary female notches defined at a different position than those of the first or second members.

Interference feature 202 may be coupled to an existing clamp flange assembly. For example, in the exemplary embodiment, male members 204 and 208 are welded to preexisting existing clamp connectors 132 and 154, and female members 206 and 210 are welded to preexisting hubs 122 and 144. Furthermore, clamp connectors 132 and 154 are coupled to hubs 126 and 148 via a cable (not shown). In alternative embodiments, interference feature 202 may be formed unitarily with the clamp flange assembly, such that male members 204 and 208 and clamp connectors 132 and 154 are a unitary assembly, and such that female members 206 and 210 and hubs 122 and 144 are a separate unitary assembly.

FIG. 5 is a schematic view of an exemplary clamp connector portion of another exemplary embodiment of a clamp connector system, designated clamp connector system 300, for use with connection joints 110 and 112 shown in FIG. 1. FIG. 6 is a cross-sectional view of an exemplary hub portion of clamp connector system 300. Clamp connector system 300 includes elements substantially similar to clamp connector system 100, including but not limited to first clamp connector 132, second clamp connector 154, first hub 122, and third hub 144. However, in the exemplary embodiment, clamp connector system 300 also includes an interference feature 302. Interference feature 302 includes at least a first or male member 304 and a second or female member 306 at first connection joint 110, and at least a first or male member 308 and a second or female member 310 at second connection joint 112. For example, in the exemplary embodiment, male member 304 includes a key that extends outward from hub 122 and female member 306 includes a complementary notch 312 defined in first clamp connector 132. Male member 308 also includes two keys extending from hub 144 and female member 310 also includes complementary notches 314 defined in second clamp connector 154. In alternative embodiments, male members 304 and 308 and female members 306 and 310 are shaped and/or positioned in any other configuration that enables clamp connector system 300 to function as described herein.

To couple first pipeline 114 together, first hub 122 is positioned adjacent to second hub 126 (shown in FIG. 1) with first clamp connector 132 connected thereto such that clamp connector 132 receives at least a portion of hub flanges 128 and 130 (both shown in FIG. 1). Male members 304 are received within corresponding notch 312 of female member 306 such that clamp connector 132 is positionable around the hubs as described above. Similarly, to couple second pipeline 136 together, third hub 144 is positioned adjacent to fourth hub 148 (shown in FIG. 1) with second clamp connector 154 coupled thereto such that clamp connector 154 receives at least a portion of hub flanges 150 and 152 (both shown in FIG. 1). Male members 308 are received within corresponding notches 314 of female member 310 such that clamp connector 154 is positionable around the hubs as described above.

As such, if an attempt to couple two pipeline sections together is made, such as sections 116, 118, 138, and 140 (all shown in FIG. 1), only the sections that have corresponding male and female members can be coupled together. If two mismatched pipeline sections are attempted to be coupled together, e.g., two section that do not have corresponding male and female members, clamp connector system 300 and interference feature 302 prevents first clamp connector 132 from coupling to third hub 144 and second clamp connector 154 from coupling to first hub 122.

In alternative embodiments, clamp connector system 300 and/or interference feature 302 may be modified to include any other number of additional pipelines to facilitate reducing the likelihood of improper pipeline sections being inadvertently coupled together. For example, on a third pipeline, interference feature 302 may include one or more male members and complementary female notches defined at a different position than those of the first or second members.

Interference feature 302 may be coupled to an existing clamp flange assembly. For example, in the exemplary embodiment, male members 304 and 308 are welded to preexisting respective hubs 122 and 144 and female members 206 and 210 are formed within preexisting respectively clamp connectors 132 and 154. Furthermore, clamp connectors 132 and 154 are coupled to hubs 126 and 148 via a cable (not shown). In alternative embodiments, interference feature 302 may be formed unitarily with the clamp flange assembly, such that male members 304 and 308 and hubs 122 and 144 are a unitary assembly, and such that female members 306 and 310 and clamp connectors 132 and 154 are a separate unitary assembly.

The above-described assemblies provide a cost-effective system for reducing undesirable clamped flange connections on pipelines that are substantially identically sized. Specifically, an interference feature on one of the clamped flange connections restricts inadvertently cross-connecting two or more improper but similarly-sized pipelines. By reducing undesirable pipeline connections, and thus improper cross-pipeline fluid flow, maintenance costs associated with improper connections are facilitated to be reduced. Further, by permanently coupling the interference feature to the pipelines, the connector system will not be undesirably lost or misplaced. Additionally, the system is more durable than merely labeling the pipelines. In some embodiments, the interference feature may be coupled to a preexisting clamped flange connection, thereby reducing upgrade costs. By retrofitting existing clamped flange connections, or by using new off-the-shelf clamped flange connections, the interference feature is an easy and time-saving safety feature that is relatively inexpensive. Additionally, the structural integrity of the clamped flange connection is maintained through the add-on interference feature so any recheck of the connection design is not needed. In each embodiment, the interference feature provides a mechanical system that is durable and accessible to the user.

The systems and methods described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A clamp connector system for use with a plurality of flanged connections, wherein each of said flanged connections includes a first hub, a first flange extending from said first hub, a second hub, and a second flange extending from said second hub, said system comprising:
    a first clamp connector sized to circumferentially couple about said first and second flanges of a first of said plurality of flanged connections, such that said first and second flanges of said first flanged connection are secured together;
    a second clamp connector sized to circumferentially couple about said first and second flanges of a second flanged connection of said plurality of flanged connections, such that said first and second flanges of said second flanged connection are secured together; and
    an interference feature defined on at least one of said first flanged connection and said second clamp connector, said interference feature oriented to prevent said first flange of said first flanged connection from coupling to said second flange of said second flanged connection.

2. The clamp connector system in accordance with claim 1, wherein said interference feature is defined on said first hub of said first flanged connection and said second clamp connector.

3. The clamp connector system in accordance with claim 1, wherein said interference feature comprises a ring coupled about said first hub of said first flanged connection.

4. The clamp connector system in accordance with claim 1, wherein said interference feature comprises a pin coupled to said second clamp connector.

5. The clamp connector system in accordance with claim 1, wherein said first clamp connector is coupled to said second hub of said first flanged connection via a first cable, and said second clamp connector is coupled to said second hub of said second flanged connection via a second cable.

6. The clamp connector system in accordance with claim 1, wherein said inference feature comprises a plurality of male members and a plurality of female members, each said female member is configured to receive one of said plurality of male members.

7. The clamp connector system in accordance with claim 6, wherein each of said plurality of male members comprises a pin coupled to said first and second clamp connectors respectively.

8. The clamp connector system in accordance with claim 6, wherein each of said plurality of female members comprises a ring coupled about said first hub of said first flanged connection and about said first hub of said second flanged connection, each ring comprising at least one notch defined thereon.

9. The clamp connector system in accordance with claim 6, wherein each of said plurality of male members comprises a key coupled to said first hub of said first flanged connection and to said first hub of said second flanged connection.

10. The clamp connector system in accordance with claim 6, wherein each of said plurality of female members comprises a notch defined in said first and second clamp connectors respectively.

11. A clamp connector system for use with a gas turbine assembly, said system comprising:
    a plurality of flanged connections, each of said flanged connections comprising:
        a first hub;
        a first flange extending from said first hub;
        a second hub; and
        a second flange extending from said second hub;
    a first clamp connector sized to circumferentially couple about said first and second flanges of a first of said plurality of flanged connections, such that said first and second flanges of said first flanged connection are secured together;
    a second clamp connector sized to circumferentially couple about said first and second flanges of a second flanged connection of said plurality of flanged connections, such that said first and second flanges of said second flanged connection are secured together; and
    an interference feature defined on at least one of said first flanged connection and said second clamp connector, said interference feature oriented to prevent said first flange of said first flanged connection from coupling to said second flange of said second flanged connection.

12. The clamp connector system in accordance with claim 11, wherein said interference feature is defined on said first hub of said first flanged connection and said second clamp connector.

13. The clamp connector system in accordance with claim 11, wherein said interference feature is welded to said first hub of said first flanged connection and said second clamp connector.

14. The clamp connector system in accordance with claim 11, wherein said first clamp connector is coupled to said second hub of said first flanged connection via a first cable, and said second clamp connector is coupled to said second hub of said second flanged connection via a second cable.

15. The clamp connector system in accordance with claim 11, wherein said inference feature comprises a plurality of male members and a plurality of female members, each said female member is configured to receive one of said plurality of male members.

16. The clamp connector system in accordance with claim 15, wherein each of said plurality of male members is unitary with said first and second clamp connectors.

17. The clamp connector system in accordance with claim 15, wherein each of said plurality of female members is unitary with said first hub of said first flanged connection and with said first hub of said second flanged connection.

18. The clamp connector system in accordance with claim 11, further comprising a seal ring configured to be positioned between said first and second flanges of said plurality of flanged connections when secured together.

19. The clamp connector system in accordance with claim 11, wherein said interference feature comprises a pin coupled to said second clamp connector.

20. A gas turbine assembly comprising:
- a fuel supply system coupled to a gas turbine via a plurality of flanged connections, each of said flanged connections comprising:
  - a first hub;
  - a first flange extending from said first hub;
  - a second hub; and
  - a second flange extending from said second hub; and
- a clamp connector system comprising:
  - a first clamp connector sized to circumferentially couple about said first and second flanges of a first of said plurality of flanged connections, such that said first and second flanges of said first flanged connection are secured together;
  - a second clamp connector sized to circumferentially couple about said first and second flanges of a second flanged connection of said plurality of flanged connections, such that said first and second flanges of said second flanged connection are secured together; and
  - an interference feature defined on at least one of said first flanged connection and said second clamp connector, said interference feature oriented to prevent said first flange of said first flanged connection from coupling to said second flange of said second flanged connection.

* * * * *